(12) United States Patent
Cook

(10) Patent No.: US 7,896,603 B2
(45) Date of Patent: *Mar. 1, 2011

(54) TRANSPORT TRAILER

(75) Inventor: Mark E. Cook, Lufkin, TX (US)

(73) Assignee: Mark E. Cook, Lufkin, TX (US)

( * ) Notice: Subject to any disclaimer, the term of this patent is extended or adjusted under 35 U.S.C. 154(b) by 271 days.

This patent is subject to a terminal disclaimer.

(21) Appl. No.: 12/125,601

(22) Filed: May 22, 2008

(65) Prior Publication Data

US 2008/0286079 A1 Nov. 20, 2008

Related U.S. Application Data

(63) Continuation-in-part of application No. 11/866,802, filed on Oct. 3, 2007, which is a continuation-in-part of application No. 11/581,919, filed on Oct. 17, 2006, now Pat. No. 7,588,407.

(51) Int. Cl.
 *B60B 29/00* (2006.01)
(52) U.S. Cl. .................. 414/426; 414/331.14; 474/150
(58) Field of Classification Search ............. 198/301, 198/312, 681, 682; 414/426, 427, 564, 679, 414/331.04, 331.14; 474/148, 150
See application file for complete search history.

(56) References Cited

U.S. PATENT DOCUMENTS

| | | | |
|---|---|---|---|
| 3,557,966 A | * | 1/1971 | Skubic .................. 211/24 |
| 3,850,295 A | * | 11/1974 | Black .................. 206/304 |
| 5,027,991 A | | 7/1991 | Braddock |
| 5,356,163 A | | 10/1994 | Suggs, Sr. |
| 5,823,558 A | | 10/1998 | Shoquist |
| 5,927,931 A | | 7/1999 | Raben |
| 6,157,889 A | | 12/2000 | Baker |
| 6,382,644 B1 | | 5/2002 | Rawlings |
| 6,527,499 B2 | | 3/2003 | Leimbach et al. |
| 6,814,214 B2 | | 11/2004 | Warlow et al. |
| 2001/0028838 A1 | | 10/2001 | Leimbach et al. |
| 2003/0226470 A1 | | 12/2003 | Dibble et al. |

* cited by examiner

*Primary Examiner*—Saúl J Rodríguez
*Assistant Examiner*—Joshua I Rudawitz
(74) *Attorney, Agent, or Firm*—Browning Bushman P.C.

(57) ABSTRACT

A trailer (10) or container (11) includes a frame (12) having a central axis (14) spaced between rear wheels. A plurality of storage supports (20) are supported on the trailer frame, with each storage support supporting a plurality of objects thereon. A carriage assembly (24) rotates the plurality of storage supports. A powered drive (110) rotates the carriage assembly. A powered restrictor (120) limits rotational movement of a respective carriage support during transit. Flexible members 142 and 144 interconnect the drive member and driven members each mounted with respect to a storage support. The container may be transported on a motorized vehicle. A preferred tire support mechanism is provided for use when transporting tires.

19 Claims, 11 Drawing Sheets

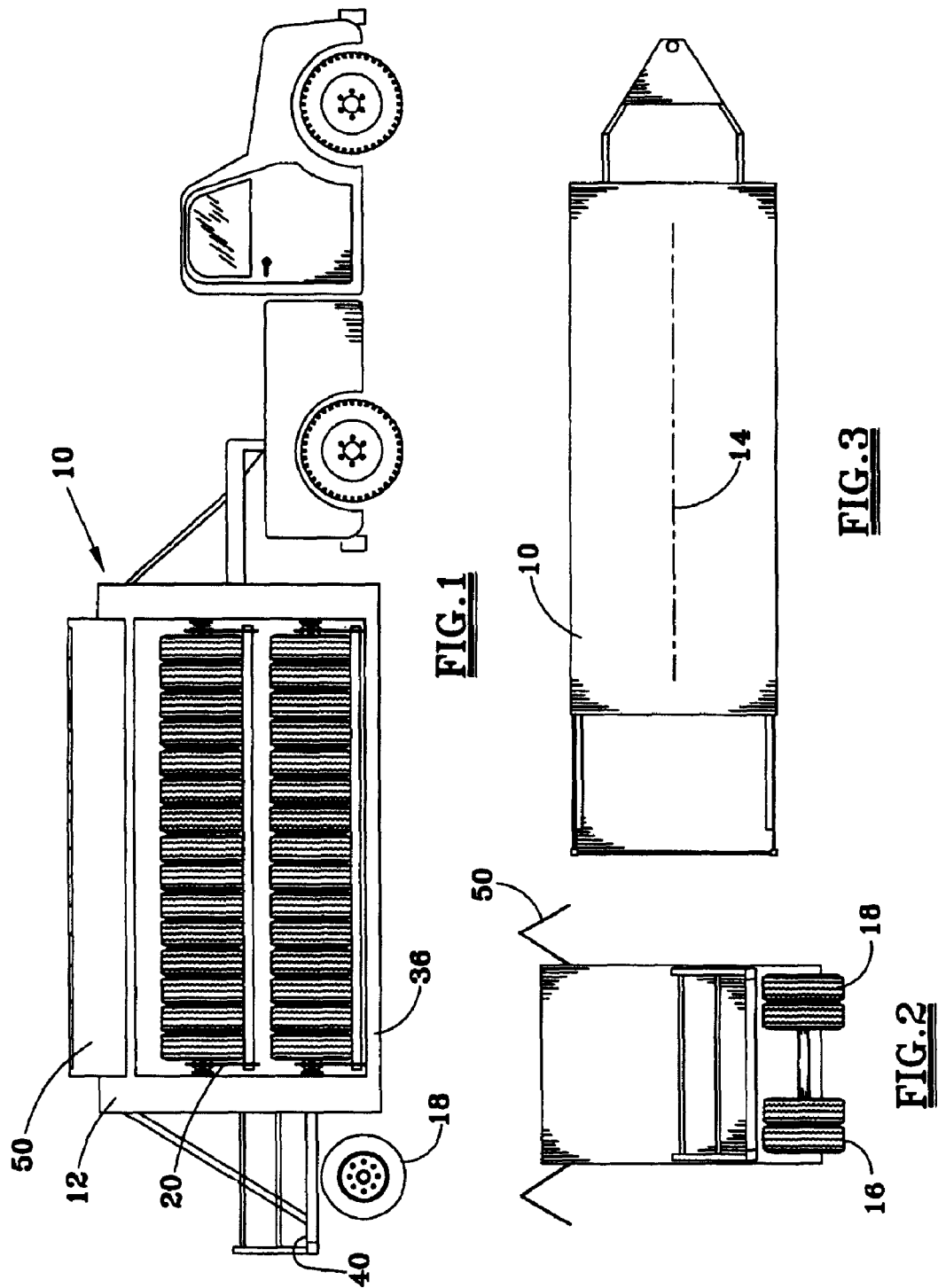

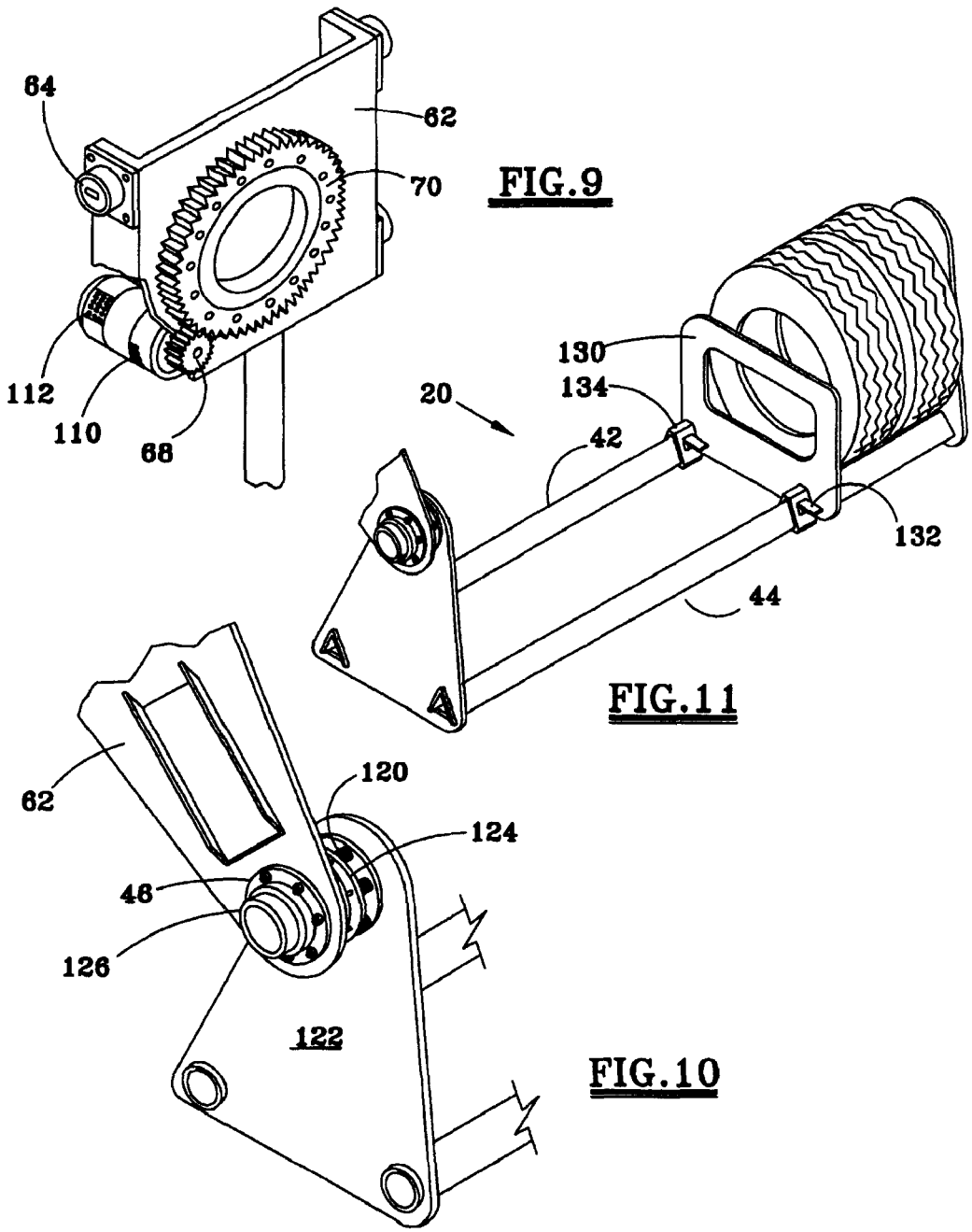

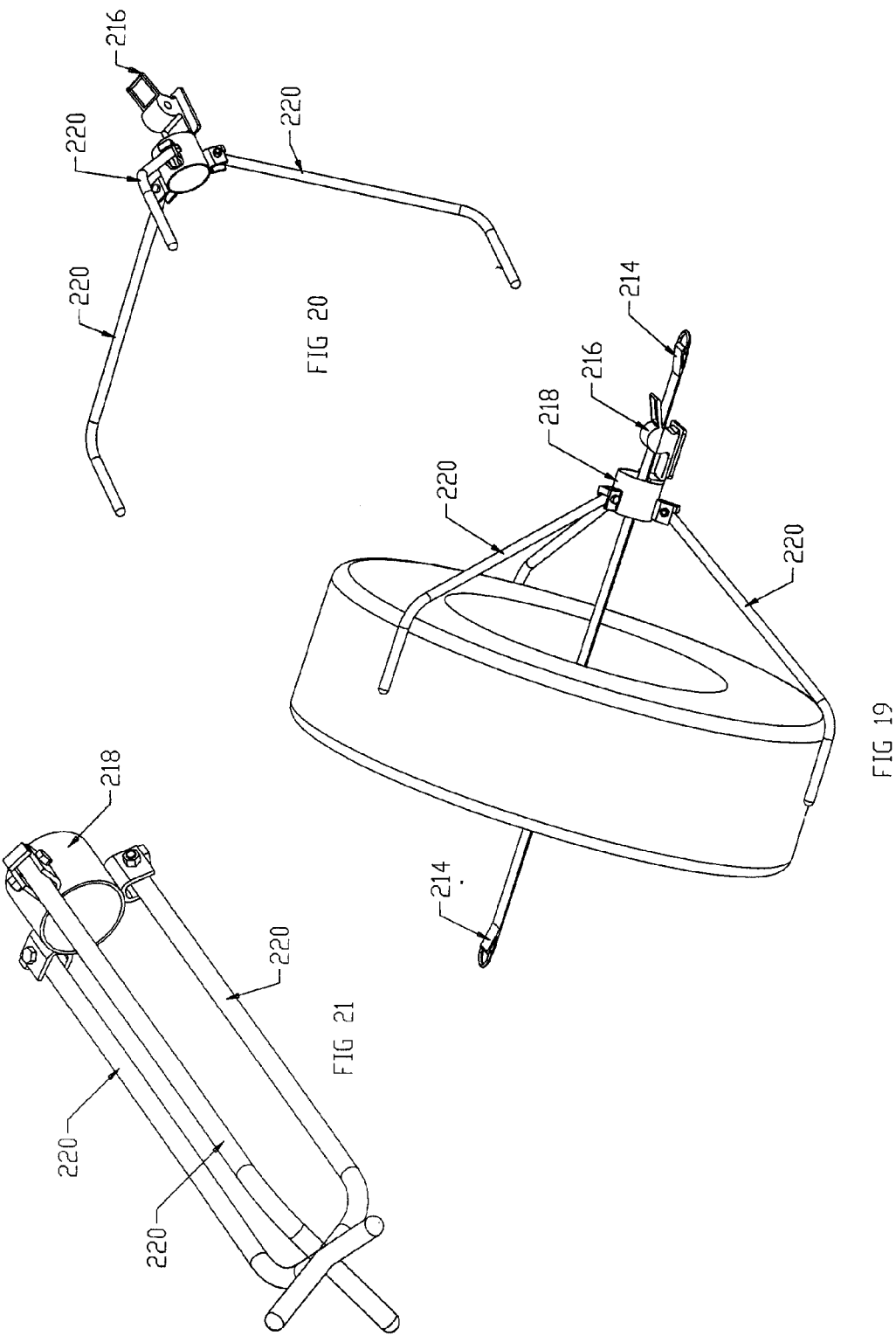

TRANSPORT TRAILER

RELATED APPLICATIONS

The present application is a continuation-in-part of U.S. Ser. No. 11/866,802 filed Oct. 3, 2007 which is a continuation-in-part of U.S. Ser. No. 11/581,919 filed Oct. 17, 2006 now U.S. Pat. No. 7,588,407.

FIELD OF THE INVENTION

The present invention relates to trailers of the type conventionally used for transporting objects, including trailers removably connected to or integral with a powered operator cab. More particularly, this invention relates to an improved trailer, and to a container for storing objects to be transported.

BACKGROUND OF THE INVENTION

Various types of trailers have been devised to transport objects, and trailers have been specifically designed for transporting one type of object. Nevertheless, a considerable time and money are incurred in loading and unloading selected ones of the transported objects at a specific location. Moreover, trailer workers are commonly injured when loading and unloading objects from a trailer, particularly when the objects are heavy and/or bulky.

U.S. Pat. No. 6,814,214 discloses a unitary trailer and powered operator cab. The trailer includes a pallet and conveyor system for loading pallets onto the vehicle, with the pallets movable in an elongate loop with front and rear ends of the loop rotating about an axis parallel to the vehicle's axis.

Various types of patents disclose systems for generally transporting tires. U.S. Pat. No. 5,927,931 discloses a lift for raising and lowering a stack of tires. U.S. Pat. Nos. 5,027,991 and 5,356,163 each disclose structures for transporting a single tire. U.S. Pat. No. 6,382,644 discloses a transport and a tire and wheel assembly. A device referred to as the Tire Butler being promoted by Mobile Concepts, Inc. uses a truck-trailer for transporting tires. Publication 2001/0028838 and U.S. Pat. No. 6,527,499 also disclose equipment for handling and transporting tires.

U.S. Pat. No. 5,823,558 discloses a trailer loading support. A load distribution system for trucks is disclosed in U.S. Pat. No. 6,157,889. Publication 2003/0226470 discloses a rail transport system for bulk materials.

The disadvantages of the prior art are overcome by the present invention, and an improved trailer and method are hereinafter disclosed.

SUMMARY OF THE INVENTION

In one embodiment, a trailer for transporting objects includes a trailer frame having a central axis spaced between left-side and right-side rear wheels, and a plurality of storage units supported on the trailer frame, with each supporting unit for supporting a plurality of objects thereon and having a storage support axis substantially parallel to the trailer frame central axis. A carriage is provided for rotatably supporting the plurality of storage units about a carriage axis substantially parallel with the trailer central axis. A powered carriage rotator is provided for rotating the plurality of supports about a carriage axis. A powered brake is also provided for prohibiting rotation of the plurality of supports when power is not applied to the carriage rotator.

In another embodiment, a powered restrictor is provided for limiting rotational movement of a carriage support during transit of the trailer. In a preferred embodiment, a powered restrictor may be provided for each of the plurality of carriage supports. In another embodiment, a divider slidable along the pair of elongate support members for maintaining the transported goods in a substantially upright position.

These and further features and advantages of the present invention will become apparent from the following detailed description, wherein reference is made to the figures in the accompanying drawings.

BRIEF DESCRIPTION OF THE DRAWINGS

FIG. 1 is a side view of a suitable trailer and powered operator cab with the side doors raised.

FIG. 2 is a rear view of the trailer shown in FIG. 1, with the side doors raised.

FIG. 3 is a top view of the trailer shown in FIG. 1, with the side doors closed and the operator cab removed.

FIG. 9 illustrates a preferred drive motor for rotating the carriage and for prohibiting rotation when power is not applied to the motor.

FIG. 10 illustrates a portion of a carriage assembly with an electric brake for minimizing axial movement of a storage rack.

FIG. 11 illustrates a slidable divider for maintaining the transported goods in a substantially upright position on the storage rack.

FIG. 19 illustrates an alternate mechanism for retaining one or more tires positioned on a pair of supports.

FIG. 20 illustrates another view of the mechanism shown in FIG. 19 without illustrating the elongate strap.

FIG. 21 illustrates a tire retaining mechanism in a collapsed position.

DETAILED DESCRIPTION OF PREFERRED EMBODIMENTS

FIG. 1 discloses one embodiment of a trailer 10 for transporting tires. For the depicted embodiment, a powered operator cab may be used to transport the trailer removable from the cab, or the trailer may be integral with the frame of the powered transport cab. In the latter case, the combination of a trailer and a cab is generally referred to as a truck.

Figure 5:
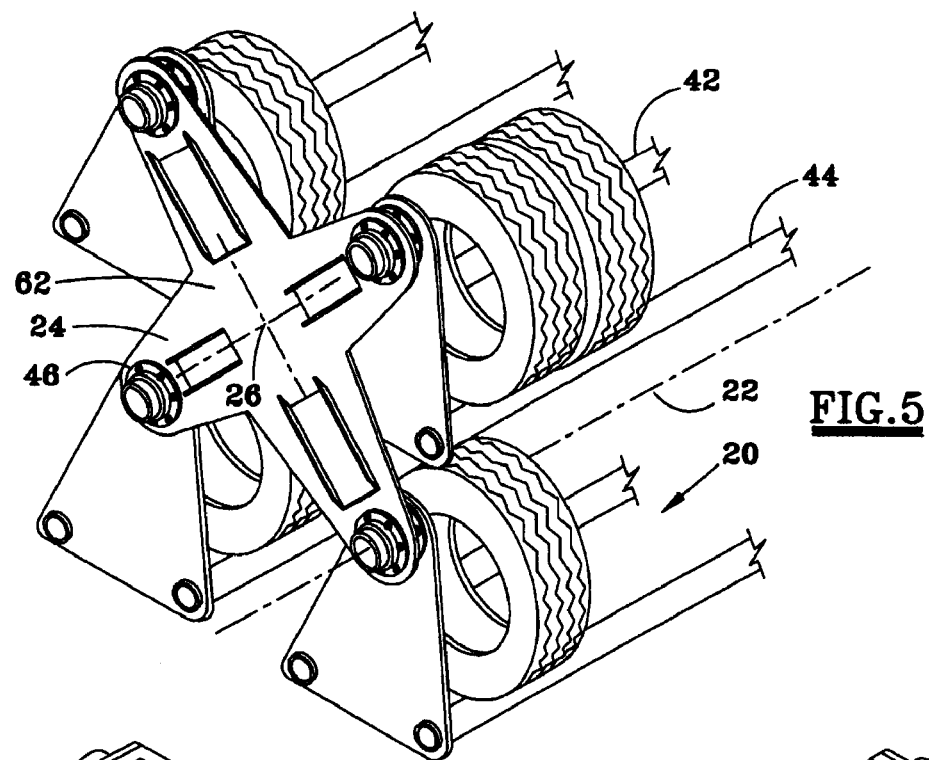
FIG. 5 illustrates a portion of the carriage assembly.
Figures 6, 7:
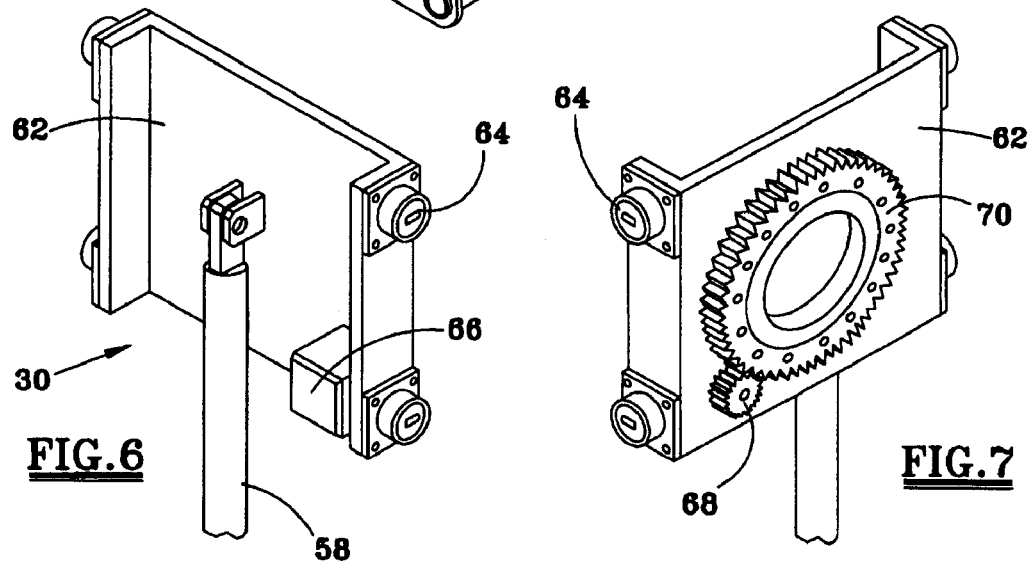
FIG. 6 illustrates an upper end of a lifting cylinder and a lifting plate for raising and lowering the carriage assembly.
FIG. 7 illustrates another view of a rotatable lifting cylinder and lifting plate.

The trailer includes a trailer frame 12 having a central axis 14 which, as shown in FIG. 3 is spaced between a left-side rear wheel 16 and a right-side rear wheel 18. As disclosed further below, the trailer frame supports a plurality of storage units 20, which for the embodiment depicted in FIG. 1, is a plurality of tires. Each storage unit has a storage support axis 22 which is substantially parallel to the trailer central axis 14. A portion of the carriage assembly 24 is shown in FIG. 5, and rotatably supports the plurality of tires about a carriage axis substantially parallel with the trailer central axis. A lift mechanism 30 as shown in FIG. 6 is provided for raising and lowering the carriage and thereby the objects supported on the storage units with respect to the trailer frame.

For the embodiment as shown in FIG. 1, the entirety of the carriage and the plurality of storage units are forward of the rear wheels of the trailer. A storage deck 40 is provided above the rear wheels for storing miscellaneous objects. As explained further below, the carriage assembly may be raised and lowered, so that when loading or unloading objects, the objects are desirably relatively close to the ground. In other embodiments, the carriage assembly has a stationary horizontal carriage axis and is not raised or lowered. As shown in FIG. 1, the low position of the tires relative to the ground is achieved by providing a lower portion 36 of the trailer frame which is vertically below the centerline of the wheels 16, 18. In a preferred embodiment, the trailer frame supports moveable side panels 50, which may be lowered to be flush with the exterior of the frame during transport, as shown in FIG. 3, but may be raised as shown in FIGS. 1 and 2 when the trailer is parked to allow for full viewing of the carriage operation.

Figures 4, 8:
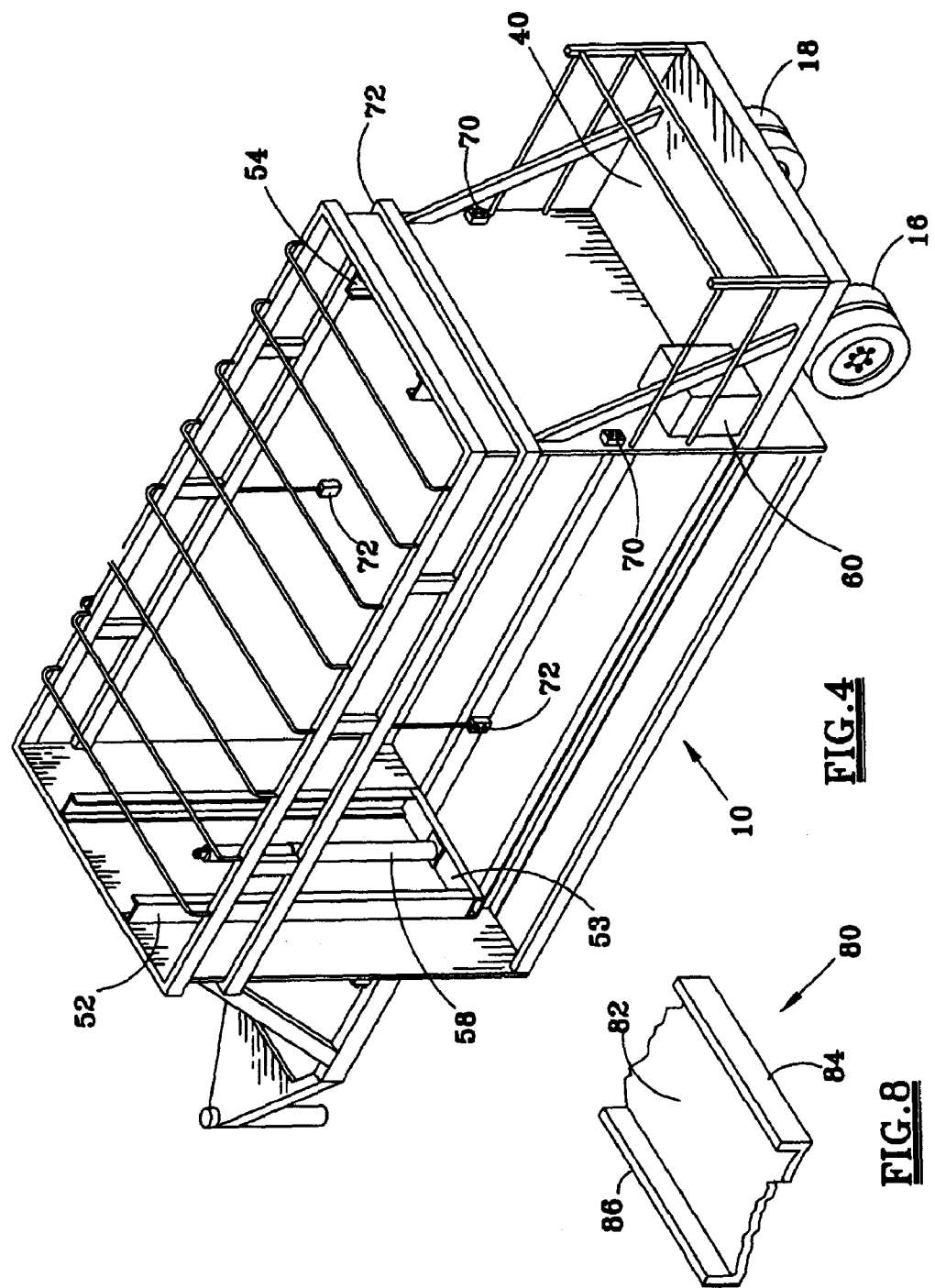
FIG. 4 is a pictorial view of a portion of the trailer shown in FIG. 1.
FIG. 8 illustrates a portion of a suitable tray supported on the carriage assembly for holding boxes or other goods.

FIG. 4 shows in further detail suitable components of the trailer 10. The frame 12 includes a pair of spaced apart front guides 52, with each guide suitably formed by a C-channel. A similar pair of rear guides 54 are also shown. These guides allow for the selective raising and lowering of the carriage by one or more powered fluid cylinders 58. A lower portion of cylinder 58 is shown in FIG. 4 between the pair of front guides 52 and resting on a frame guide base 53. FIG. 4 also illustrates a suitable rear deck 40 for storage of miscellaneous components, including a power unit 60 for powering operation of the carriage assembly.

FIG. 5 illustrates a portion of the carriage assembly 24 which, for the depicted embodiment, includes 4 storage units each having a central axis 22 so that the storage unit may rotate as a subassembly about pivot 46 with respect to rotatable carriage end plate 62. For handling tires, the storage unit may include rods or other elongate supports 42, 44 as shown in FIG. 5, each extending between the spaced apart end plates 62 of the carriage assembly.

The carriage assembly 24 may be raised or lowered by a lift mechanism 30 including one or more powered cylinders 58 and a guide plate 62 at the upper end of each cylinder. The moveable plate 62 includes a plurality of rollers or other suitable guides 64, which are guided by the front and rear supports for raising and lowering the carriage assembly.

FIG. 6 also discloses a suitable drive unit 66, which may rotate gear 68 as shown in FIG. 7, thereby driving gear 70. Gear 70 may then be secured to a respective end plate 60, so that operation of motor 66 controllably rotates the carousel assembly about its central axis 26. A similar drive assembly may be provided at the other end of the carriage assembly for simultaneously raising or lowering the other end of the carousel, although a single drive assembly is suitable for many applications. In an alternate embodiment, a drive unit or a drive unit and internal gear box may rotate a shaft aligned with carousel assembly or carriage axis 26, as shown in FIG. 5.

Various controls 70, 72 may be provided at desired locations on the trailer, including the sides of the trailer where objects are loaded and unloaded onto and from the storage units, and at the rear of the trailer near the power unit 60. These controls may be regulated by an operator to slowly raise the carousel, thereby allowing activation of the motor 66 to rotate the carousel so that the desired storage rack with the objects to be unloaded and loaded may be positioned on the desired side of the trailer and close to the ground. These controls 70, 72, if desired, may rotate the carousel in either a clockwise or a counterclockwise direction. Safety circuits may be used to ensure that the carousel is not rotated until raised to a sufficient level so that the carousel can rotate without hitting the lower frame of the trailer.

The storage supports as disclosed herein comprise a plurality of racks which are free to rotate with respect to the carriage end plates. In most applications, three or more racks may be equally spaced circumferentially about the carriage. A significant feature of the carriage assembly is that it allows the operator to load or unload goods from either side of the trailer. In some applications, the right-side of the trailer may be blocked, yet the operator may easily and safety unload goods from the left-side of the trailer. At the next delivery spot, the operator has the flexibility of unloading from the left-side of the trailer when the right-side of the trailer is blocked.

Depending on the goods being transported, the rotatable carriage assembly may benefit significantly from a lift mechanism, as disclosed herein. In other applications, and particularly those wherein the goods are relatively light, such as goods transported in the snack food industry, a lift mechanism for raising and lowering the carriage may not be necessary.

Referring now to FIG. 9, an alternative drive motor 110, which may be electrically or hydraulically powered, rotates the gear 68 and thereby the driving gear 70 to rotate the carriage assembly. Also, the gears could be eliminated, in which case the drive motor 110 may directly rotate the carriage about axis 26. The motor 110 may thus be powered to desirably position a selected carriage support near the ground surface and on the selected side of the trailer. Motor 110 may include a powered brake assembly 112 which desirably prohibits any substantial rotation of the carriage when power is not applied to the motor 110 to rotate the carriage. Brake 112 thus essentially assures that the carriage stays in a selected rotational position until motor 110 is activated. In one embodiment, a conventional switch may be used to sense when the doors 50 for on trailer are in the fully closed position. The brake 112 will remain activate to rotationally lock the position of the carriage anytime the doors 50 are fully closed. When the operator arrives at a site and opens one or both of the doors 50, that operation may be sensed by the switch, and the brake 112 deactivated so that the motor 110 may then be selectively activated. A suitable combination motor/brake is the Model 9 motor or output drive with an A2 Series spring biased parking brake sold by Auburn Gear, Inc.

Referring now to FIG. 10, another type of powered brake, sometimes referred to herein as a powered restrictor, limits rotational movement of each carriage support relative to the carriage plates during transit of the trailer. In this case, the powered restrictor 120 may be positioned between carriage end plate 62 and a selected one of the generally triangular shaped plates 122 at one end of a respective storage support. An outer portion 124 of the powered restrictor 120 may thus be bolted or otherwise secured to the plate 62, and a short shaft 126 may be secured to the plate 122 and extend through the powered restrictor 120 and through the bearing assemblies on the plates 62 and 122. When activated, the powered restrictor 120 restricts or limits rotational movement of the shaft 126 relative to the plate 62, and thus restricts rotational movement of the plate 122 and the supports 42, 44 with respect to the carriage plate 62. A restrictor 120 thus prevent "rocking" of one of the rails 42, 44 and thus the goods supported thereon during transit of the trailer. By restricting rotational movement of a storage support with respect to a carriage plate 62, undesirable rocking of the carriage support may be eliminated when the trailer is in transit. Again, the powered restrictor 120 may be automatically activated any time both of the doors 50 are in the closed position, and may be automatically deactivated when one or both of the doors are in the open position. A suitable powered restrictor is the Model 38 restrictor or spring set holding brake sold by Dynacorp.

FIG. 11 disclosed yet another feature of the invention, which feature is primarily designed to maintain objects supported on the carriage supports 42, 44 in a substantially upright position. A divider 130 is provided which is slidable along the pair of elongate supports 42, 44, which in this case may have a triangular cross-sectional configuration with an upper apex. The divider 130 may be temporarily secured with respect to the supports 42, 44 by one or more locking devices 134, which are secured to divider 130 and slide along the triangular supports 42, 44, and toggle lever 132 which moves from an unlock to a lock position. Triangular shaped notches in the divider 130 may thus ride on the upper surface of the triangular rails or supports. Alternatively, a sleeve may circumferentially surround each of the support members having a tubular configuration, and a T-shaped bolt may be used to lock the sleeve and thus the divider attached thereto in place. The operator may thus position the plate 130 against the objects stored on the support, and tighten the locking device 134 so that the objects, in this case the tires as shown in FIG. 11, will remain in substantially their upright position.

Figure 12:
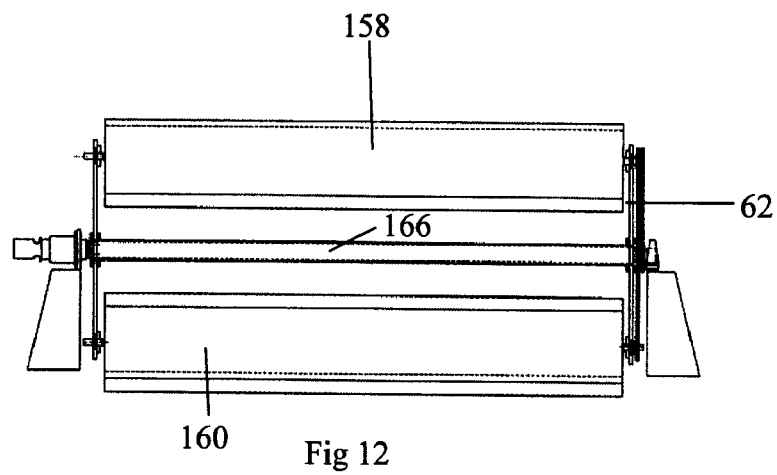
FIG. 12 illustrates a side view of an alternate drive mechanism for rotating the carriage.
Figure 13:
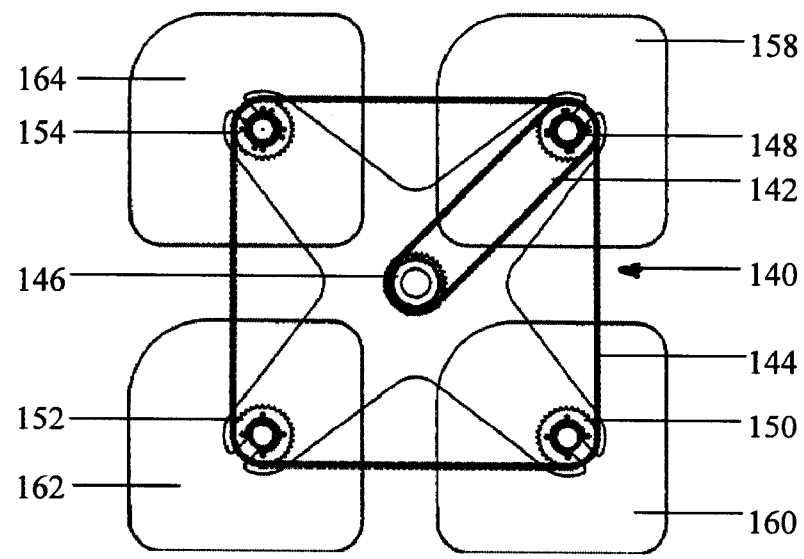
FIG. 13 illustrates an end view of the mechanism shown in FIG. 12.

FIG. 12 depicts a side view of a suitable carriage 24 including spaced apart front and rear end plates 62 which rotate with the central shaft 166, which in turn is driven by a suitable motor and brake assembly, as previously discussed. FIG. 12 depicts two of the supports 158 and 160, and two other supports 162 and 164 are shown in FIG. 13. The carriage drive motor thus rotates the drive member 146, which is preferably one of a sprocket or a pulley, which in turn is connected by flexible member 142 to a driven member, such as sprocket or pulley 148, which in turn is rotatable with and associated with the support 150. Rotation of the drive member 146 by the drive motor thus rotates the end plate 62 and the support 158. Sprocket 148 also acts to interconnect with the other driven members 150, 152 and 154 each associated with a respective support 160, 162 and 164. Rotation of the drive motor rotates the shaft 166 and simultaneously rotates each of the supports, so that a desired support will be positioned at a selected location relative to the vehicle frame during a loading and unloading operation. Since a conventional brake may be used with the drive motor, or the drive motor may have an internal brake, the assembly as shown in FIGS. 12 and 13 allows a single motor and brake as previously described to stop undesired or unintentional rotation of each of the supports due to the interaction of the flexible members 142 and 144. Conventional sprocket-type chains may be used for flexible members, or V-belts or other timing belts may be used for this purpose. The system as shown in FIGS. 12 and 13 may be used regardless of the number of supports rotationally positioned about the central axis of the carriage. Four such supports are shown in FIG. 13, but any number of supports may be used depending on the goods to be transported.

Figure 14:
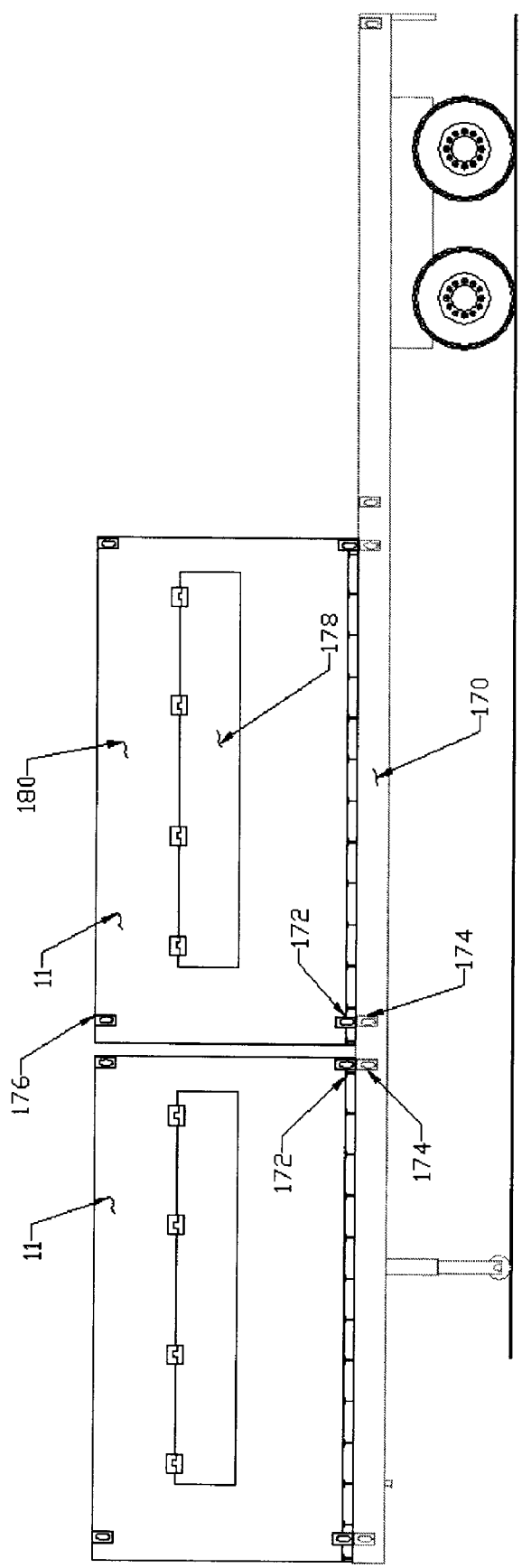
FIG. 14 illustrates a container housing a carriage assembly and positionable on a portable vehicle.

Referring now to FIG. 14, a plurality of containers 11 are shown supported on a suitable flat bed trailer 170, which may be powered by a conventional tractor (not shown). Two substantially identical containers 11 are shown on the trailer 170, although the trailer may be sized to receive two, three, or more containers, depending on the length of the containers. As explained subsequently, the container 14 houses the carriage mechanism discussed above. Lower members 172 on the container and similar member 174 on the trailer 170 may be used for receiving a suitable securing member, such as a twist lock metal band, thereby locking a container to the trailer, or locking an upper container to a lower container. FIG. 11 also shows a hinged access door 178 which is secured to side 180 of the container and allows an operator to obtain easy access to goods on the carousel once the container is positioned on the ground.

Figure 15:
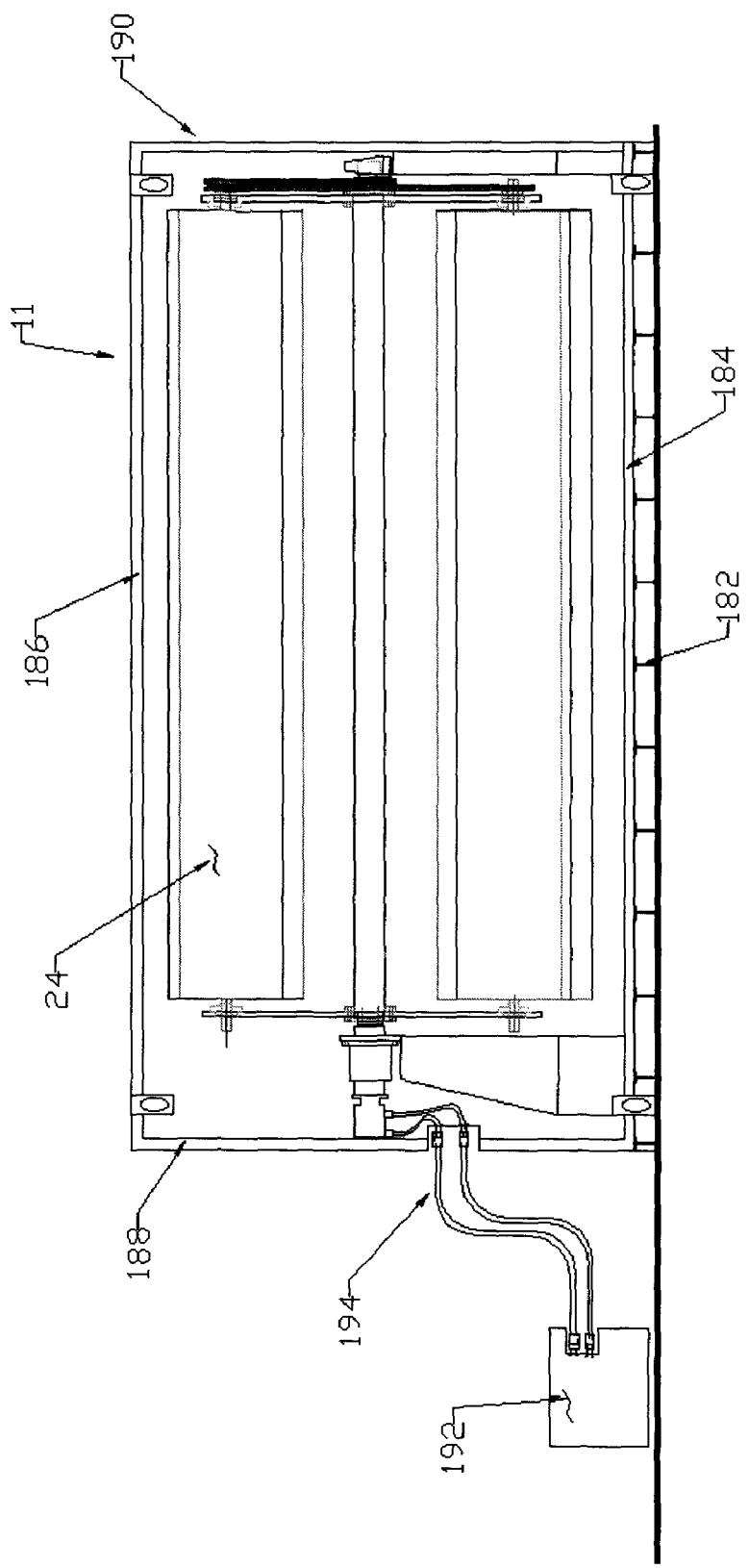
FIG. 15 is a cross-sectional view of the container shown in FIG. 14 positioned on the ground.
Figure 16:
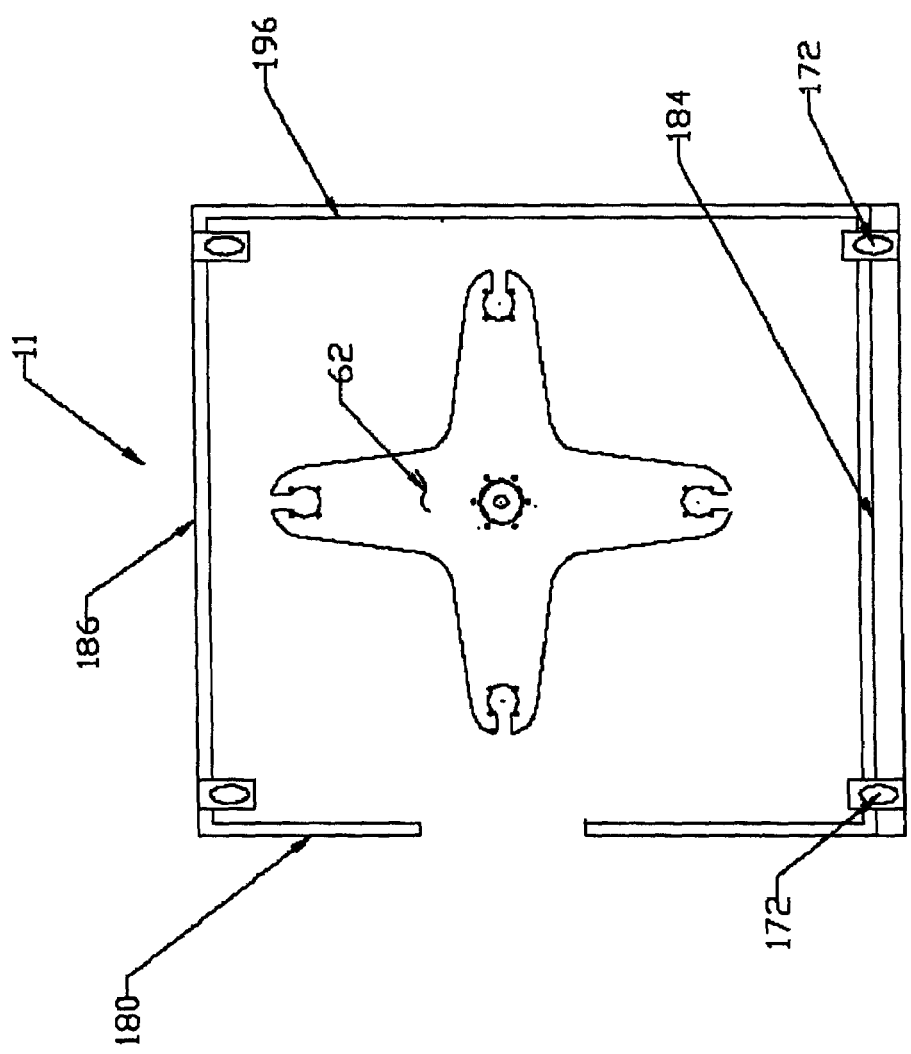
FIG. 16 illustrates a cross-sectional view of the container and an end view of the carrier assembly.
Figure 17:
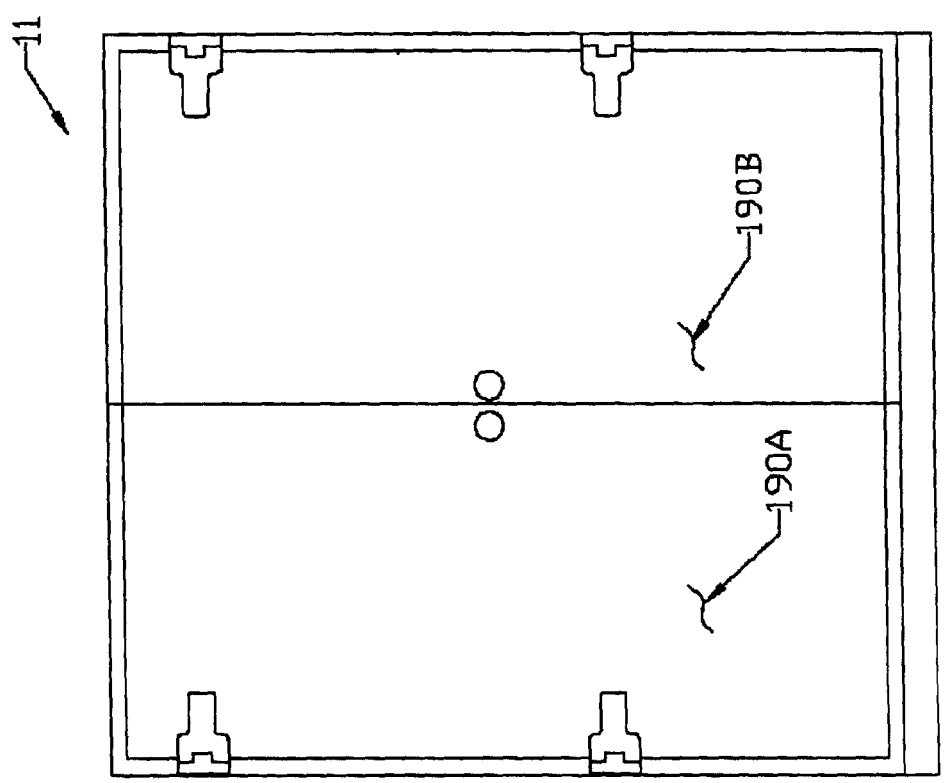
FIG. 17 illustrates rear doors on the container.

Referring now to FIG. 15, one of the containers 11 shown on FIG. 14 is shown positioned on the ground with a plurality of I-beams 182 raising the floor 184 of the container off the ground. The top of the roof 186 of the container is shown, along with front plate 188 and rear plate 190. A powered carriage assembly 24 as previously discussed is provided within the interior of the container, and includes a plurality of rotatable storage units. As shown in Figure 15, power to rotate the carriage assembly may be provided by a conventional hydraulic unit 192, with hydraulic hoses 194 interconnecting the hydraulic unit and the drive motor. FIG. 16 is a cross-sectional view of the container 11, with the access door 178 removed, and illustrating the opposing side plate 196 and the securing members 172 raising the floor 184 slightly above the ground surface. The rear end plate 62 as shown in FIG. 16 is positioned within the container 11 such that the supports and the goods supported thereon may be rotated about the axis of the carriage. FIG. 17 illustrates the end plates 190 at the rear of the container, which may be hinged to the container sides so that a pair of doors 190A and 190B may be conventionally opened to obtain easy access to the carriage assembly. This allows the carriage assembly to be more easily maintained, and also allows the entire carriage assembly, if necessary, to be removed from or reinserted into the container 11.

Figure 18:
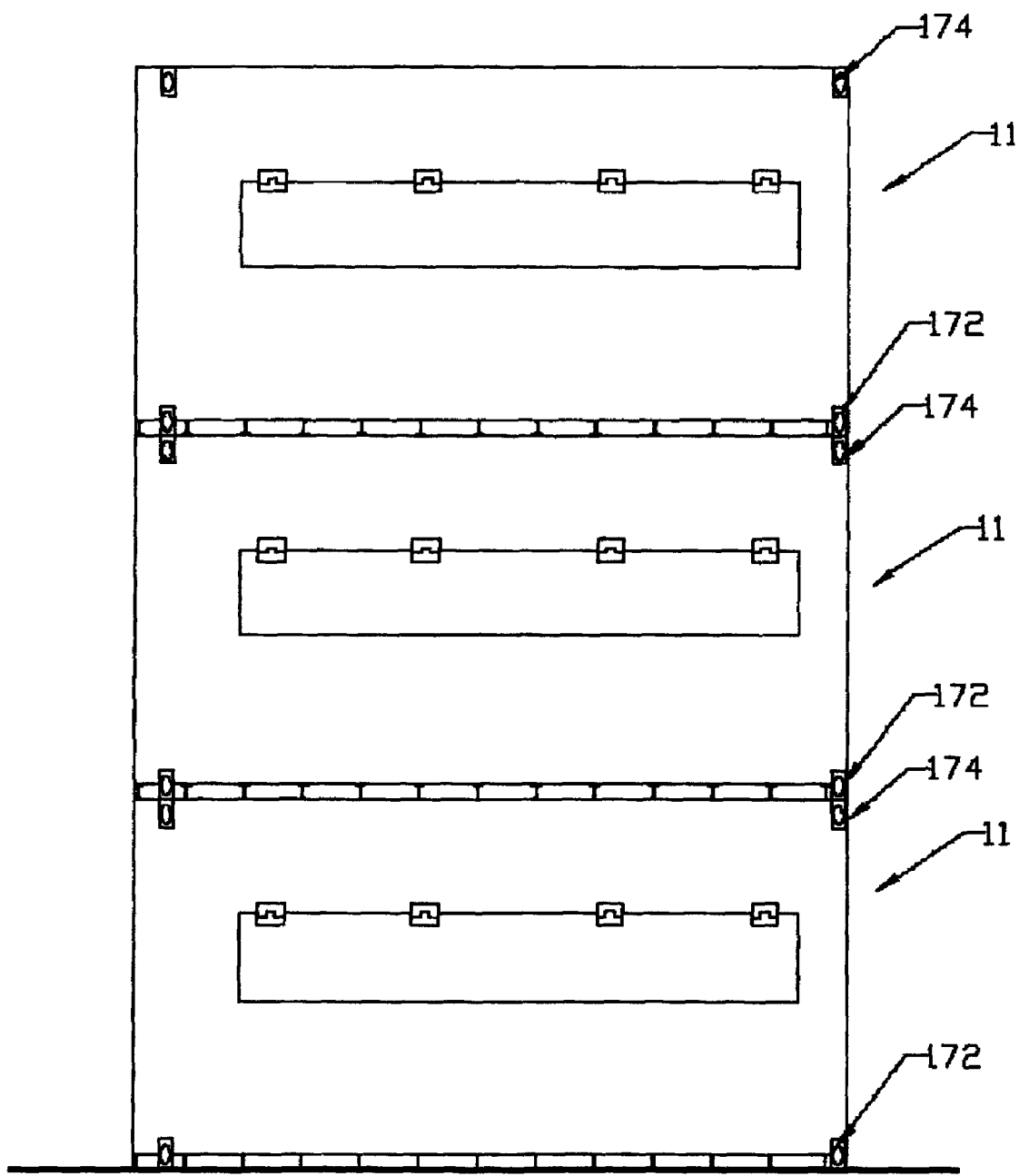
FIG. 18 illustrates a plurality of stacked containers.

FIG. 18 illustrates a plurality of containers 11 stacked vertically for storage. In many cases, goods may thus be stored on the carriage assembly and a plurality of containers then stacked for easy storage, as shown in FIG. 18.

Referring now to FIG. 19, an alternative mechanism 210 is provided for reliably storing one or more tires on a suitable pair of supports (as previously discussed). In the FIG. 19 embodiment, an elongate strap 210 has one end fixed to an end plate of the carriage assembly, while the other end 214 of the strap is fixed to the opposing plate of the carriage assembly. Various types of flexible members may be used for this purpose, including straps, cords, or chains. A suitable locking mechanism 216 is provided for selectively positioning along the length of the strap, and for locking the mechanism in a selected position. The sleeve 218 is fixed to the locking mechanism 216, and includes a plurality of pivot arms 220 which in FIG. 19 are shown in the outward position for engaging the tire.

The arms pivot with respect to sleeve 218 to achieve a retracted position as shown in FIG. 21, which allows one end of the strap, the locking mechanism 216 and a retracted plurality of arms to pass through the hole in the center of the tire or a wheel with a tire, or a plurality of tires, that are positioned on the storage rack. Once all the tires are positioned on the rack, the opposing end of the strap may be connected to the opposing end plate, so that the strap essentially becomes fairly rigid. With the tires pushed against one of the ends of the support rack, the locking mechanism 216 may be moved so that is a selected distance from the last tire, as shown in FIG. 19, and the arms 20 positioned to engage an outward portion of the tire and thereby support the tires in the vertical position on the rack, then the lock engaged to hold that position during transit. Various types of locking mechanisms may be used, and only a representative locking mechanism for a suitable strap is disclosed. The mechanism as shown in FIG. 21, when in the collapsed position, thus has a sufficiently reduced diameter to conveniently pass through both the center hole in the tire, and also through the center hole of a tire and rim assembly.

The trailer as disclosed herein may have two opposing side doors and a rear door, with the rear door typically being used to unload and load non-standard sized products, e.g., products that cannot be reliably shelved on a storage support. In other embodiments, the trailer may have only one side door, or a side door and a rear door. In yet other embodiments, two or more side doors may be provided on either side of the trailer and/or additional rear doors may be provided, particularly for long trailers.

The trailer or container as disclosed herein may be used for transporting various objects other than tires. Bottles of water may be transported in a similar manner to tires, and oils or other liquids may be transported in drums or boxes. A conventional shelf or tray rather than space rods may be used to support a plurality of boxes between the end plates, and such a support tray would be suitable for transporting vehicular batteries, package delivery boxes, and various products distributed to retail food stores, including produce, dairy products, cookies/crackers, bread, and potato chips. A tray 80 as shown in FIG. 8 may extend between the end plates 62 replacing the purpose of the rods 42, 44. The tray 86 preferably having a base or floor 82, and sides 84, 86. The tray 86 may be suitably supported to hold to the weight of the goods between the end plates 62.

The term "trailer" as used herein refers to a trailer or other container removably connected to a powered operator cab, whether termed a tractor, a truck, or a cab, and includes fifth wheel trailers and gooseneck trailers. A "trailer" also includes the trailer portion of cab/trailer combinations, whether detachable from the cab or integral with the cab. A conventional utility truck for delivery of parcels or bread is thus considered to include a trailer which is fixed to rather than removable from the cab. The trailer of the present invention offers the ability to sort various products for delivery or pickup, to load the goods curbside on either side of the trailer, and to handle heavy objects without significant lifting. A refrigerated trailer may be used for transporting dairy products, meat, or seafood.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A trailer for transporting objects, comprising:
   a trailer frame having a central axis spaced between a left-side rear wheel and a right-side rear wheel;
   a plurality of storage supports supported within the trailer frame, each storage support supporting a plurality of objects thereon, each storage support having a storage support axis substantially parallel to the trailer frame central axis;
   a carriage for rotatably supporting the plurality of storage supports about the carriage axis, which is substantially parallel with the trailer central axis;
   a drive motor for rotating the plurality of supports about the carriage axis, the carriage including a rotatable drive member, a flexible member interconnecting the rotatable drive member and one or more of a plurality of driven members each rotatable with a respective storage support, and another flexible member interconnecting the one or more of the plurality of driven members with others of the plurality of driven members, thereby simultaneously rotating the plurality of storage supports; and
   a brake for prohibiting rotation of the drive member and thus the plurality of storage supports about the carriage axis when power is not applied to the drive motor.

2. A trailer as defined in claim 1, wherein the flexible member and the another flexible member are each one of a flexible chain and a timing belt.

3. A trailer as defined in claim 1, wherein the rotatable drive member and each of the one or more rotatable driven members are one of a sprocket and pulley each having an axis substantially parallel to the storage support axis.

4. A trailer as defined in claim 1, further comprising:
   a lift mechanism for raising and lowering the carriage with respect to the trailer chassis and thereby the objects supported on the storage supports.

5. A trailer as defined in claim 1, wherein a trailer frame supported on the trailer chassis supports movable side panels.

6. A trailer as defined in claim 1, wherein each storage support comprises a pair of spaced apart elongate generally horizontal support members.

7. A trailer as defined in claim 6, wherein each support member includes a pivot for rotating the carriage support with respect to the carriage axis.

8. A trailer as defined in claim 1, further comprising:
   a powered restrictor for limiting the rotational movement of a storage support during transit of the trailer.

9. A trailer as defined in claim 1, further comprising:
   a tire support mechanism for supporting one or more tires on a respective storage support, the tire support mechanism including an elongate flexible member extending between axially opposing ends of the carriage, a locking mechanism selectively positionable along the elongate flexible support, and a plurality of arms each extending radially outward from the locking mechanism to engage the tire.

10. A trailer as defined in claim 9, wherein each of a plurality of arms is pivotable from a retracted position to pass the arms through a tire to an extended position to support the tire.

11. A container positionable on a motorized vehicle for transporting objects, comprising:
    a container frame;
    a plurality of storage supports supported within the container frame, each storage support supporting a plurality of objects thereon, each storage support having a storage support axis substantially parallel to a central axis of the container frame;
    a carriage for rotatably supporting the plurality of storage supports about the carriage axis, which is substantially parallel with the container frame central axis; and
    a drive motor for rotating the plurality of supports about the carriage axis, the carriage including a rotatable drive member, a flexible member interconnecting the rotatable drive member and one or more of a plurality of driven members each rotatable with a respective storage support, and another flexible member interconnecting the one or more of the plurality of driven members with others of the plurality of driven members, thereby simultaneously rotating the plurality of storage supports.

12. A container as defined in claim 11, wherein the flexible member and the another flexible member are each one of a flexible chain and a timing belt.

13. A container as defined in claim 11, wherein the rotatable drive member and each of the one or more rotatable driven members are one of a sprocket and a pulley each having an axis substantially parallel to the storage support axis.

14. A container as defined in claim 11, further comprising:
a brake for prohibiting rotation of the drive motor and thus the plurality of storage supports about the carriage axis when power is not applied to the drive motor.

15. A container as defined in claim 11, wherein the container frame has a substantially rectilinear configuration to enable a plurality of containers to be supported on the motorized vehicle.

16. A container as defined in claim 11, further comprising:
a tire support mechanism for supporting one or more tires on a respective storage support, the tire support mechanism including an elongate flexible member extending between axially opposing ends of the carriage, a locking mechanism selectively positionable along the elongate flexible support, and a plurality of arms each extending radially outward from the locking mechanism to engage the tire.

17. A container for transporting objects, comprising:
a container frame having a central axis;
a plurality of storage supports supported within the container frame, each storage support supporting a plurality of objects thereon, each storage support having a storage support axis substantially parallel to the trailer frame central axis, and including a pair of spaced apart elongate generally horizontal support members;
a carriage for rotatably supporting the plurality of storage supports about the carriage axis, which is substantially parallel with the container frame central axis;
a drive motor for rotating the plurality of supports about the carriage axis;
a tire support mechanism for supporting one or more tires on a respective storage support, the tire support mechanism including an elongate flexible member extending between axially opposing ends of the carriage, a locking mechanism selectively positionable along the elongate flexible support, and a plurality of arms each extending radially outward from the locking mechanism to engage the tire; and
one of a flexible chain and a belt interconnecting the rotatable drive motor member and one or more of a plurality of driven members each rotatable with a respective storage support, and another flexible member interconnecting the one the plurality of driven members with others of the plurality of driven members.

18. A container as defined in claim 17, wherein each of a plurality of arms is pivotable from a retracted position to pass the arms through a tire to an extended position to support the tire.

19. A container as defined in claim 17, further comprising:
a powered brake for prohibiting rotation of the drive motor and thus the plurality of storage supports about the carriage axis when power is not applied to the drive motor.

* * * * *